US012512245B1

(12) United States Patent
Lown

(10) Patent No.: US 12,512,245 B1
(45) Date of Patent: Dec. 30, 2025

(54) APPARATUS AND METHOD FOR MAGNETIZING AN ANNULAR RING TO GENERATE A MULTIPOLE FIELD

(71) Applicant: Robert R. Lown, San Diego, CA (US)

(72) Inventor: Robert R. Lown, San Diego, CA (US)

( * ) Notice: Subject to any disclaimer, the term of this patent is extended or adjusted under 35 U.S.C. 154(b) by 592 days.

(21) Appl. No.: 17/878,307

(22) Filed: Aug. 1, 2022

Related U.S. Application Data

(60) Provisional application No. 63/242,364, filed on Sep. 9, 2021.

(51) Int. Cl.
*H01F 7/06* (2006.01)
*H01F 13/00* (2006.01)
*H01F 41/02* (2006.01)

(52) U.S. Cl.
CPC ....... *H01F 13/003* (2013.01); *H01F 41/0266* (2013.01)

(58) Field of Classification Search
CPC ........................... H01F 13/003; H01F 41/0266
See application file for complete search history.

(56) References Cited

U.S. PATENT DOCUMENTS

| | | | | |
|---|---|---|---|---|
| 3,735,542 A * | 5/1973 | Kocian | B24D 15/02 451/461 |
| 3,803,433 A * | 4/1974 | Ingenito | G04C 15/00 368/204 |
| 4,538,130 A * | 8/1985 | Gluckstern | H01F 7/0278 335/298 |
| 4,829,277 A * | 5/1989 | Stahura | H01F 7/0278 420/83 |
| 5,142,774 A * | 9/1992 | Jeffery | B23P 19/04 29/467 |
| 6,861,935 B1 * | 3/2005 | Leupold | H01F 7/0278 335/306 |
| 2012/0262261 A1 * | 10/2012 | Sarai | H01F 7/02 335/306 |
| 2020/0330730 A1 * | 10/2020 | Creighton | A61L 29/18 |

OTHER PUBLICATIONS

Halbach, K., "Design of Permanent Multipole Magnets With Oriented Rare Earth Cobalt Material," Nuclear Instruments and Methods, 1980, pp. 1-10, vol. 169; North-Holland Pub. Co.
McDonald, K., "Long Rod with Uniform Magnetization Transverse to its Axis," 2017, Joseph Henry Laboratories, Princeton University; available at https://slidelegend.com/queue/long-rod-with-uniform-magnetization-transverse-princeton-physics_5b4f22ab097c47e41a8b4575.html (last accessed Aug. 22, 2022).

* cited by examiner

*Primary Examiner* — Paul D Kim
(74) *Attorney, Agent, or Firm* — Rod D. Baker

(57) ABSTRACT

Apparatuses, methods, and systems for magnetizing objects to create permanent magnets. A created or resulting permanent magnet's magnetic orientation continuously varies according to Halbach's formula. The invention includes the use of one or more magnetic rods. A monobloc annular ring typically is the object that is converted into a permanent magnet; the monobloc ring lacked the desired magnetic properties prior to the practice of the invention.

30 Claims, 14 Drawing Sheets

APPARATUS AND METHOD FOR MAGNETIZING AN ANNULAR RING TO GENERATE A MULTIPOLE FIELD

CROSS-REFERENCE TO RELATED APPLICATIONS

This application claims the benefit of U.S. Provisional Patent Application Ser. No. 63/242,364 entitled “Magnetizing Device Method and System Thereof,” filed on 9 Sep. 2021, the entire disclosure of which is hereby incorporated by reference.

BACKGROUND OF THE INVENTION

Field of the Invention

The present invention relates generally to various apparatuses, methods, and systems, for imparting magnetic properties to objects. More specifically, the invention relates to apparatuses, methods, and systems of making permanent magnets wherein the orientation of magnetization continuously varies according to the Halbach’s formula

Background of the Invention

Permanent magnets have been employed, for example, for use in rotary encoders. Typically, the permanent magnet is a diametrically magnetized disc used in conjunction with a Hall effect or magneto-resistance sensing device. The magnetic field from the disc decays relatively slowly, with distance precluding the use of a second sensor in close proximity. This is due to the stray magnetic fields from one interfering with the other.

A conventional Halbach array is an arrangement of a series of permanent magnets (magnet segments). The array has a spatially rotating pattern of magnetism which cancels the field on one side of the array but boosts it on the other side. Advantages of Halbach arrays include that they can produce strong magnetic fields on one side, while generating a small stray field on the opposite side. This effect is best understood by observing the magnetic flux distribution. A Halbach array may be arranged linearly or annularly (such as, for instance, to define a cylinder); annular Halbach arrays are of interest and background to the present invention, and overcome the shortcomings of diametrically magnetized discs mentioned above.

A Halbach ring or cylinder is a circular Halbach array consisting of several trapezoidal or arc-shaped magnet segments with magnetic orientation vectors that rotate in order to focus the field. They are conventionally assembled in dipole, quadrupole, hexapole, sextupole, octupole and other magnet configurations. Generally, the larger the number of discrete permanent magnet segments (with a corresponding number of magnetic vector angles), the greater the uniformity of the field across the inside diameter of the annular Halbach assembly.

Halbach cylinders are used in NMR (nuclear magnetic resonance) devices, sophisticated high-torque motors, beam focusing, research and magnetic particle separation equipment for industrial, life science, research and development and medical applications. An ideal dipolar Halbach array produces a perfect dipole field inside the array, and zero field outside the annulus. In practice, the fields inside are not perfect and there are some stray fields. This is due to the segmentation of the magnet ring, and its finite length, in the conventional annular Halbach array. These same properties make the annular Halbach array suitable for producing the main magnetic field in NMR (nuclear magnetic resonance) and MRI (magnetic resonance imaging) applications. They are also used for the bending and focusing of charged particle beams in accelerators.

Klaus Halbach in his seminal paper “Design of Permanent Multipole Magnets with Oriented Rare Earth Cobalt Materials,” *Nuclear Instruments and Methods* 169 (1980) 1-10, taught how to arrange the orientation of a magnet’s “easy axis” to produce strong 2N multipole magnets from an oriented rare earth material (REM). Reference to Halbach’s paper may be had for helpful background to the present invention. In the known Halbach equations, N=1 denotes a dipole magnet, N=2 denotes a quadrupole magnet, etc. Halbach first derived the continuous easy axis orientation required. At the time, he considered sintered REM such as samarium cobalt, an anisotropic material with uniform easy axis orientation throughout the material. He then described generally how to compose a circular cylindrical array, including to segment the magnet into M geometrically identical pieces such that, ignoring the direction of the easy axis, the structure is invariant to rotation by the angle $2\pi/M$, about r=0. Relative to a coordinate system fixed in the piece, the easy axis advances by $N2\pi/M$ from one piece to the next.

REM materials are “hard” magnetically, requiring fields on the order of 2.5 to 3.0 Tesla to magnetize. Neodymium boron is an anisotropic REM that has higher remanent field strengths than the samarium cobalt mentioned by Halbach. Ceramic ferrite is also an extremely hard magnetic material with lower magnetic remanence, and that requires less than 1 Tesla to magnetize. Alnico is an alloy that has high remanence, but relatively low coercivity when compared to the above three. “Alnico” is a family of iron alloys which in addition to iron are composed primarily of aluminum, nickel, and cobalt. Alnico can be magnetized at fields under 0.5 Tesla.

Typical magnet manufacturing methods produce individual pieces or segments with the anisotropy direction (the easy axis) uniform throughout a piece or segment. The REM is first milled to a small particle size. The powder is then compacted in a die in the presence of a magnetic field. This field aligns the material particles so the anisotropy direction is uniform throughout the piece. The compacted piece is then sintered at high temperature to fuse the individual particles. They may then receive a final heat treatment to enhance the magnetic properties. This produces a piece or segment that is highly anisotropic and can be magnetized in the easy axis direction only. The high intrinsic coercivity of these materials requires high magnetizing fields. Each piece or segment is separately magnetized before being arranged into an annular assembly. Known annular or cylindrical Halbach arrays commonly are assembled such that the magnetic field is mostly outside the annulus or cylinder, with a nearly zero field in the interior. These arrangements are typically used for electric motor applications. For particle accelerator and NMR applications it is known to assemble the segments to provide a relatively large flux inside the annulus or cylinder and nearly zero outside the cylinder.

Such known fabrication methodology is not a cost-effective solution for high volume production of an annular Halbach array. It requires the manufacturing of several separate pieces or segments, the handling of the several pieces per ring, and their assembly against the forces of the magnetized material. It also implicates increased variability in the manufacturing process and thus more opportunity for errors. Due to the multiple steps required, fabrication efforts are high, and the possibility of adverse issues midway through the creation process is elevated. Against the foregoing background, the present invention was developed.

SUMMARY OF THE INVENTION

This summary introduces selected basic concepts or features of the invention that are further described hereinbelow, and is not intended to be limiting of the invention. This present disclosure is directed to inventive embodiments including apparatuses, systems, and methods for imparting magnetic properties to objects, for example, turning previously non-magnetized objects into permanent magnets, particularly an annular permanent Halbach magnet. An aspect of the invention is a magnetizing method and apparatus that magnetizes an object, such as annular "ring" object, according to Halbach's formula. The apparatus and method include the insertion of a magnetized insertion rod into or within the object, typically the aperture of an annular object. The non-magnetized annular ring object preferably is a unitary monobloc, and includes at least one binder material and at least one magnetic powder. The magnetized insertion rod preferably is diametrically magnetized. A further aspect of the invention is a magnetizing method and apparatus that magnetizes an object according to Halbach's formula, in which the apparatus or method includes a magnetized contact rod configured to be placed in contact with the outside of the object, such as the outside surface of an annular object. The magnetized contact rod also preferably is diametrically magnetized. According to the invention a permanent magnet array is provided in the form of an annular Halbach array.

The inventive method includes a method for making an annular Halbach array including the steps of providing a non-magnetized ring and a magnetized insertion rod, and inserting the magnetized insertion rod into the aperture of the non-magnetized ring and then removing the insertion rod, to magnetize—impart magnetism to—the ring. The inventive method may also include the steps of placing the magnetized contact rod in contact with the non-magnetized ring, and then revolving the magnetized contact rod through (at least) one complete revolution around the non-magnetized ring, preferably while maintain contact between the contact rod and the exterior peripheral surface of the non-magnetized ring. The direction of magnetism of the magnetized contact rod preferably is maintained in a parallel position relative to the direction of magnetism of the magnetized insertion rod during the complete revolution of the contact rod.

In a preferred embodiment, the magnetized contact rod moves and completes its full revolution around the non-magnetized ring before, during, or after the removal of the magnetized insertion rod from the aperture of the ring. Further, according to preferred embodiments of the present apparatus and method, the magnetized insertion rod's magnetization may be a dipole, quadrupole, or an octupole. The shape of the magnetized insertion rod optionally may be devised to reduce the deleterious effect, upon the (previously) non-magnetized ring, of the removal of the insertion rod from within the aperture of the ring. The magnetized contact rod's magnetization also may be a dipole, quadrupole, or an octupole. The shape of the magnetized contact rod also may be devised to ameliorate undesired effects upon the ring. The magnetized insertion rod optionally may be provided with a surrounding nonmagnetic cover, also to ameliorate undesired effects upon the ring from the movement of the insertion rod.

During the practice of the invention, the magnetized insertion rod preferably may be moved, including rotation or translation. The magnetized contact rod also may be rotated or translated. The magnetized insertion rod and the magnetized contact rod preferably share a common orientation in 3-D space. Nevertheless the orientation, and any axes of rotation, for both the magnetized insertion rod and the magnetized contact rod preferably are independently adjustable. An aspect of a system or apparatus according to the invention optionally includes components for conveying energy and movement to both the magnetized insertion rod and the magnetized contact rod.

Additional aspects and advantages of the invention will be set forth in part in the following description, or may be obvious from the description, or may be learned through practice of the invention.

BRIEF DESCRIPTION OF THE DRAWING FIGURES

A full and enabling disclosure of the present invention, including the best mode thereof, directed to one of ordinary skill in the art, is set forth in the specification, which refers to the appended drawings in, which:

Figure 4A:
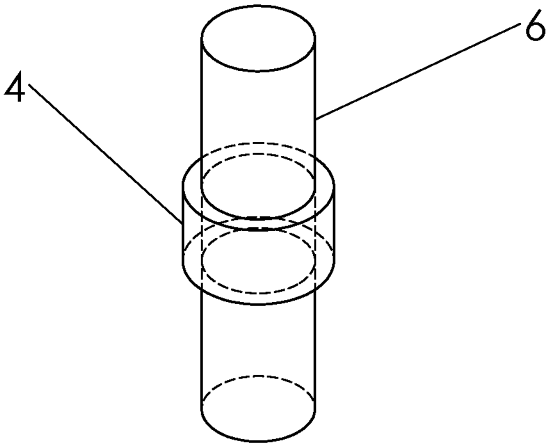
Figure 4B:
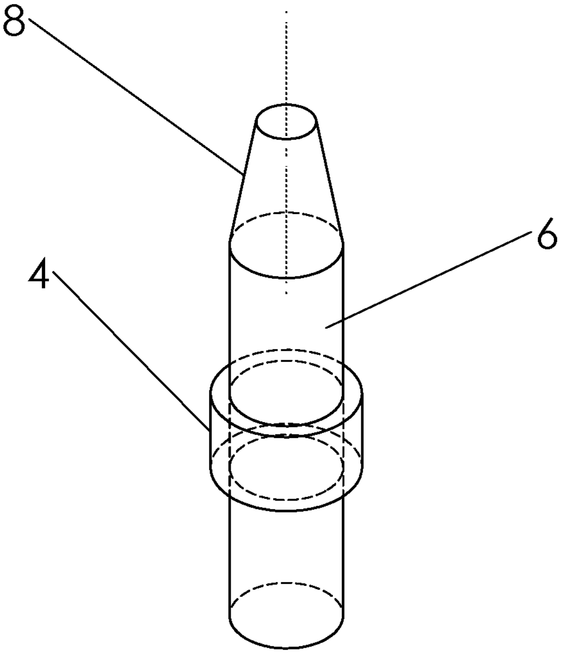
Figure 4C:
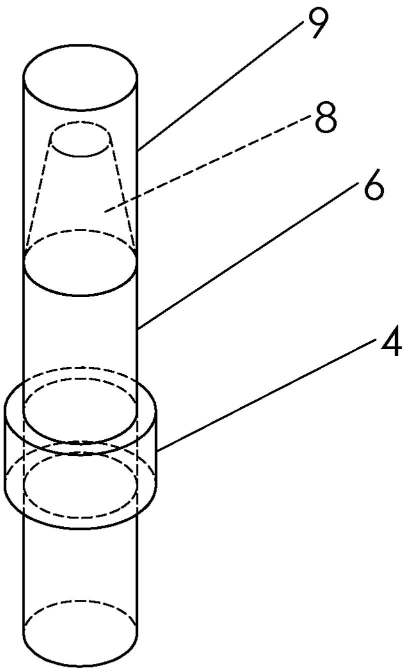
Figure 4D:
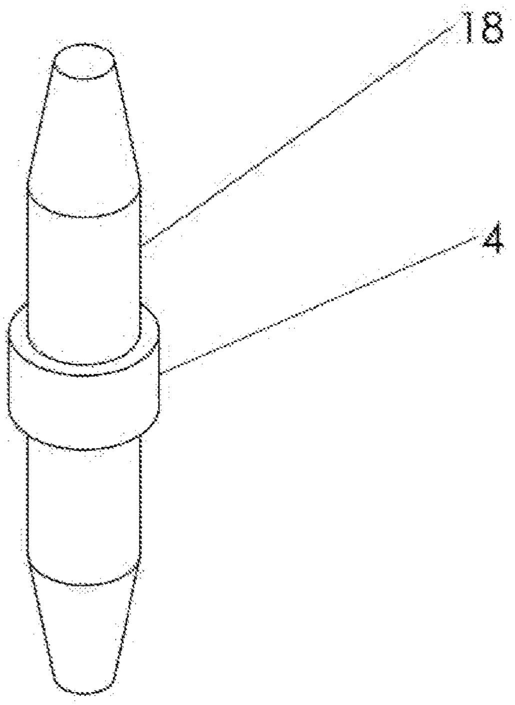
Figure 4E:
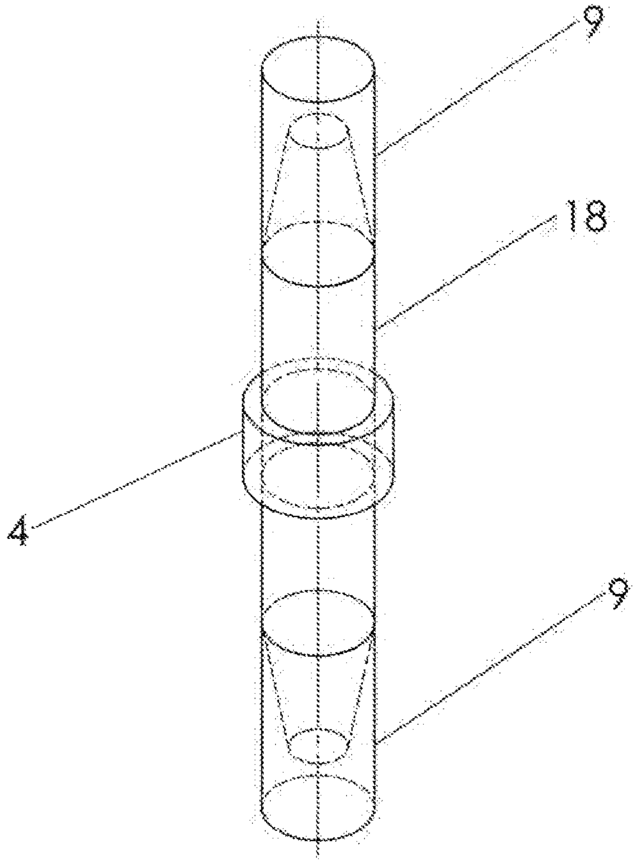
Figure 5:
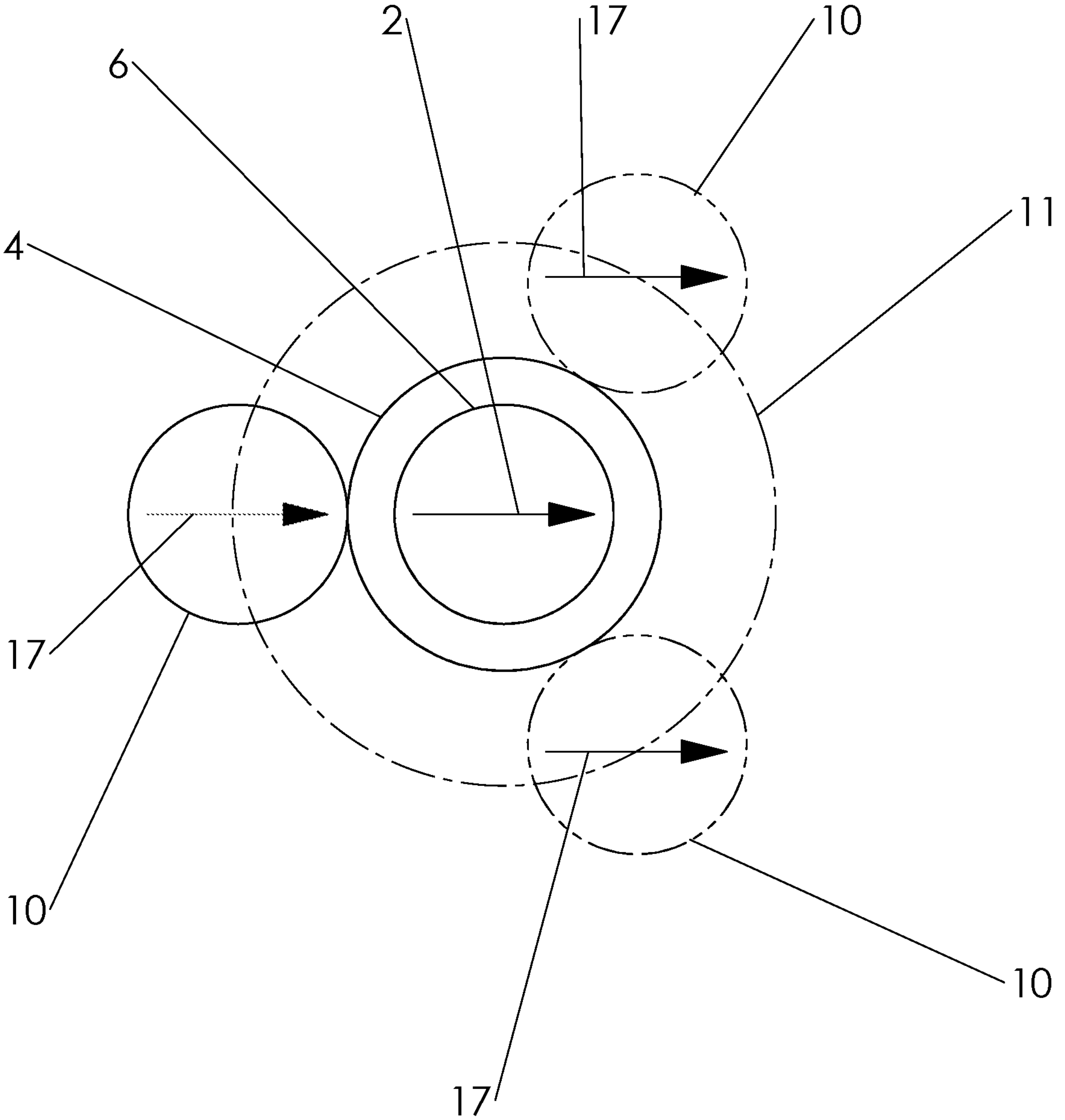
Figure 6:
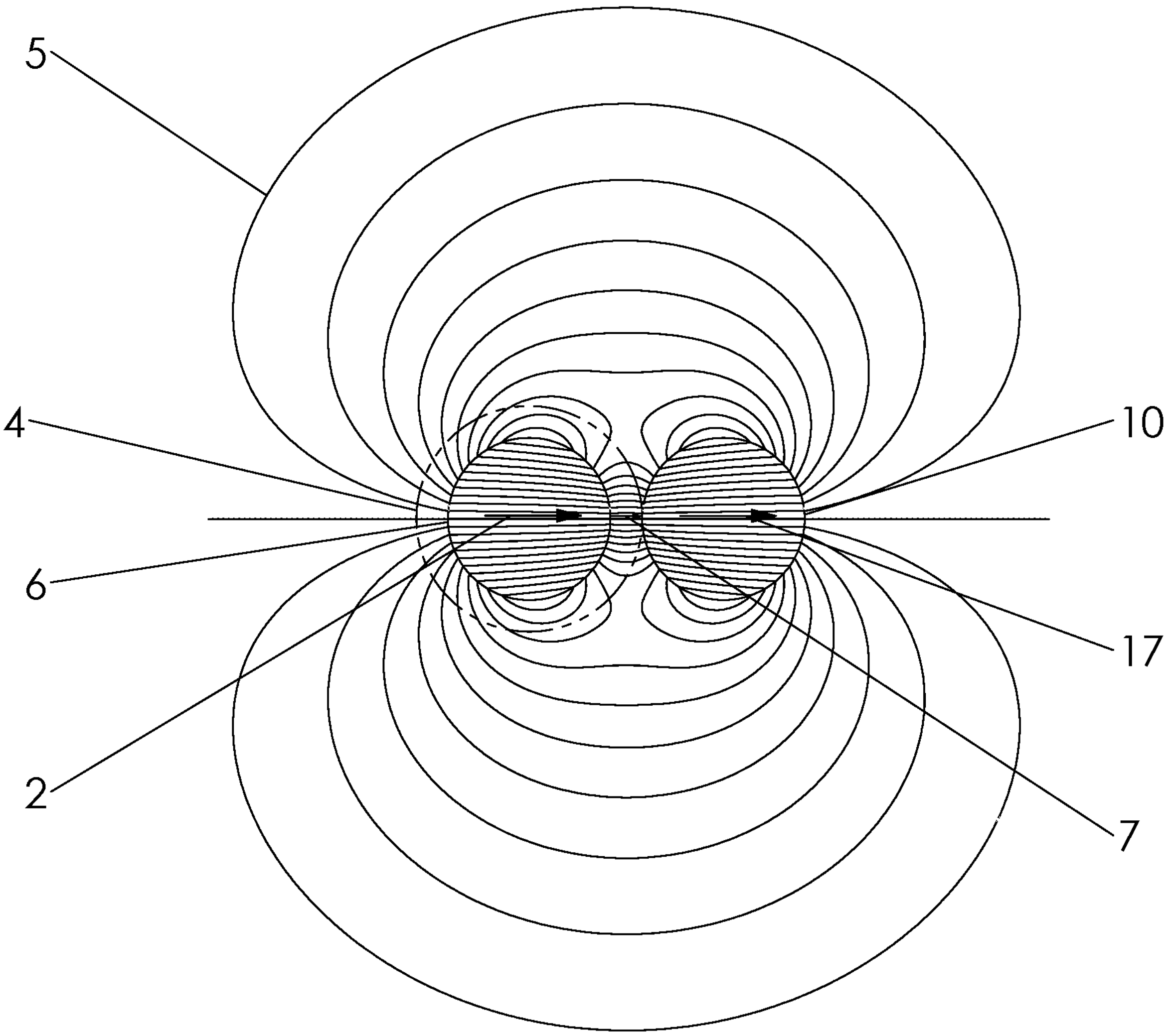
Figure 7:
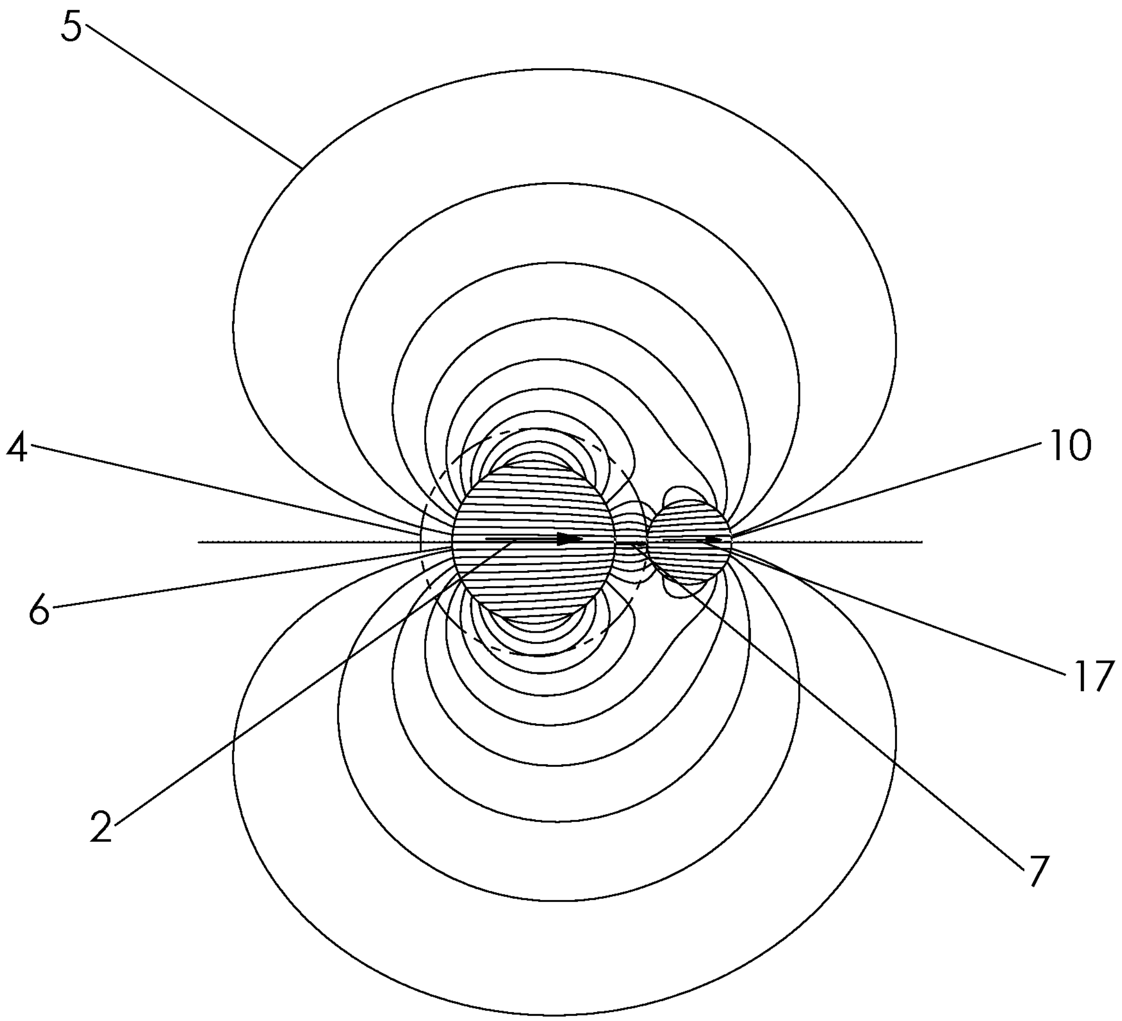
Figure 8:
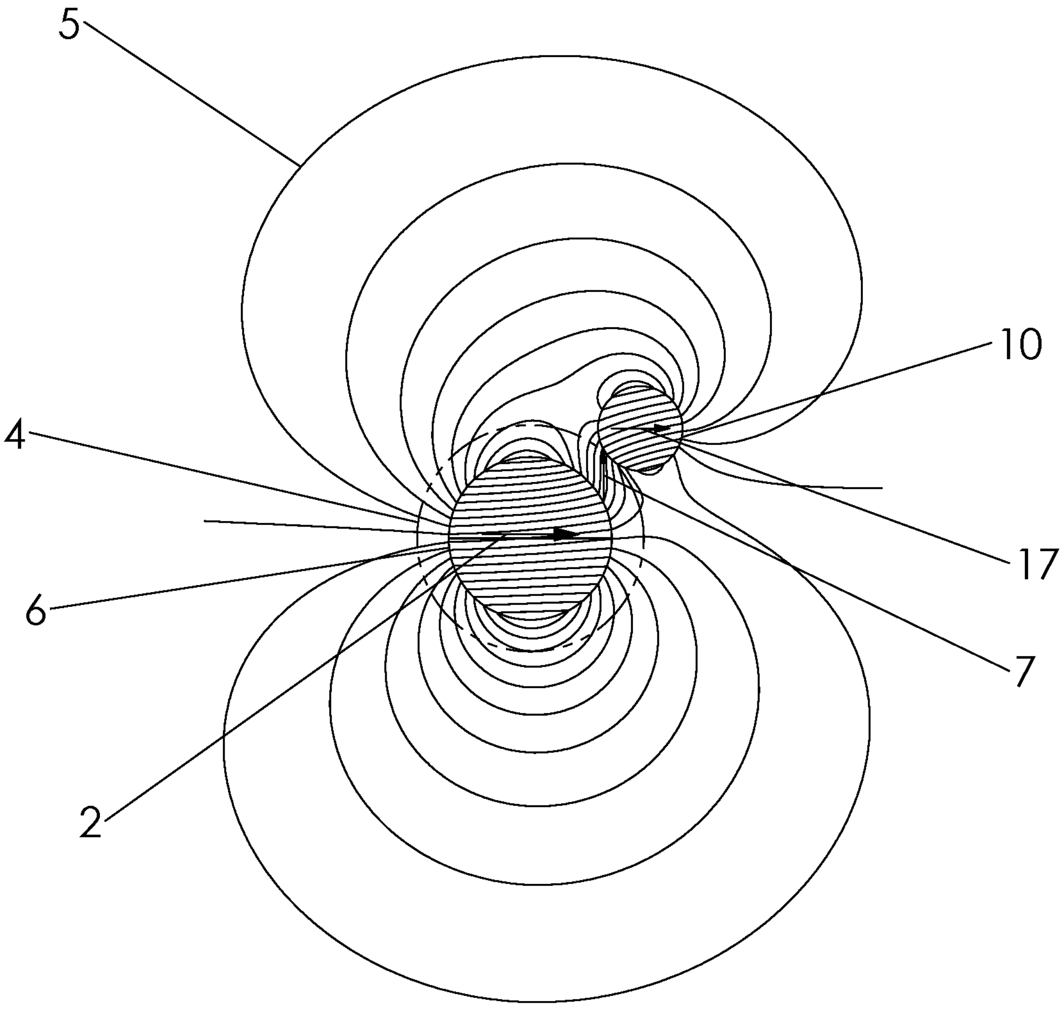
Figure 9:
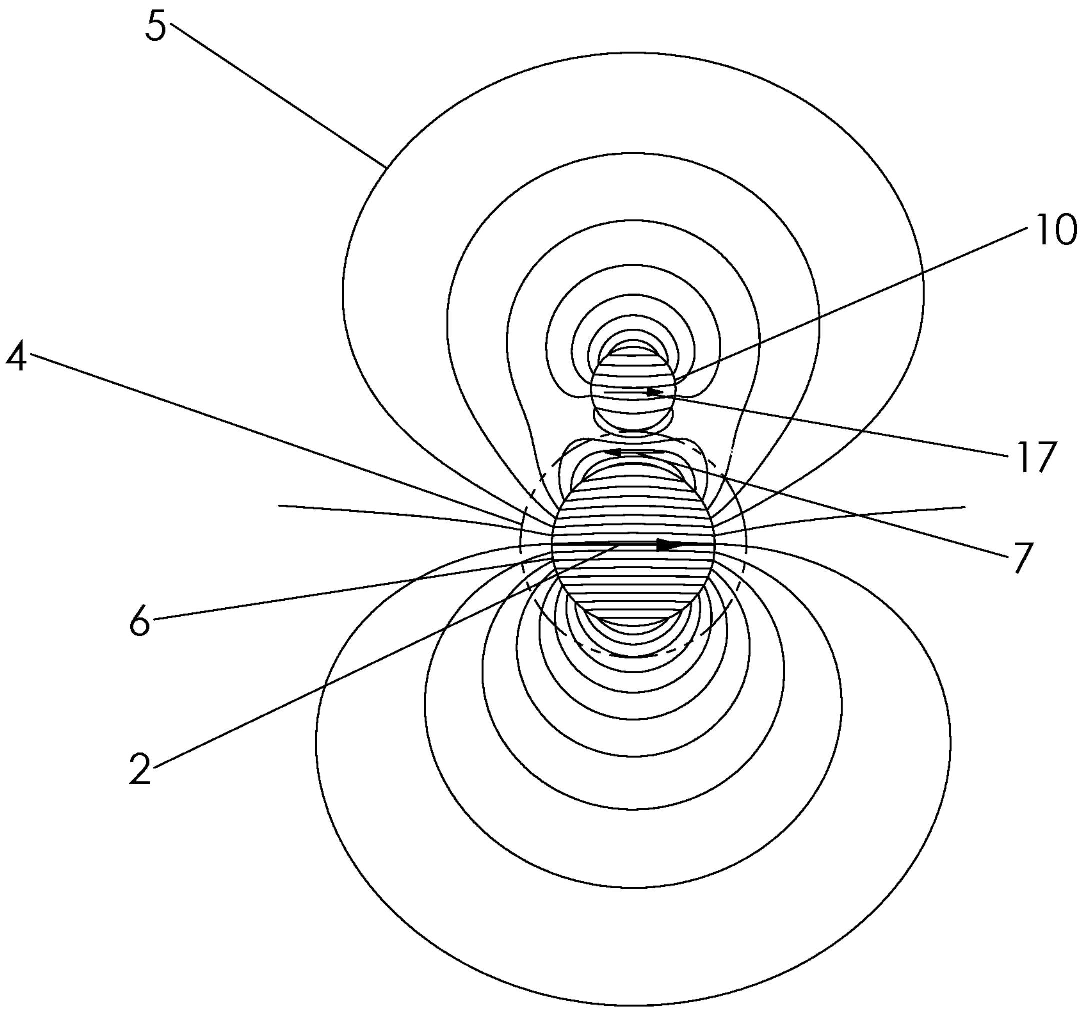
Figure 10A:
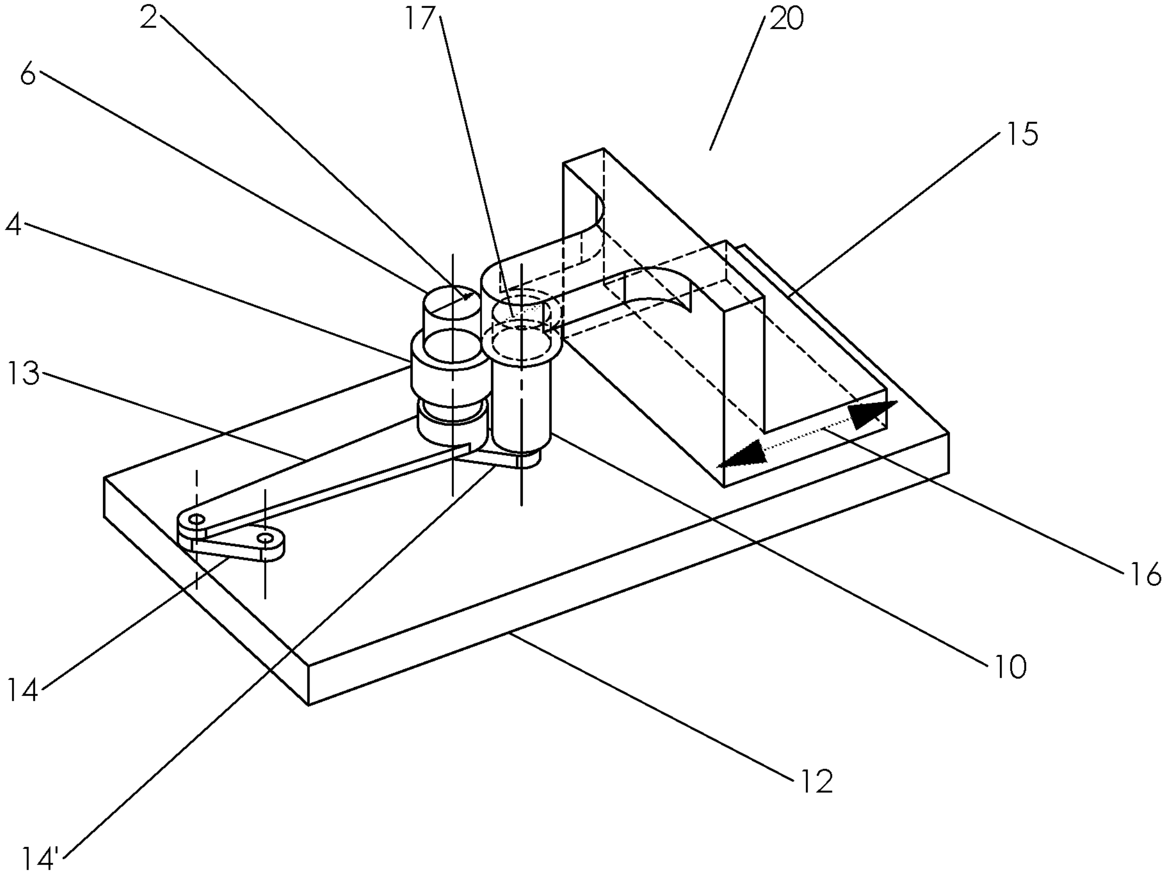
Figure 10B:
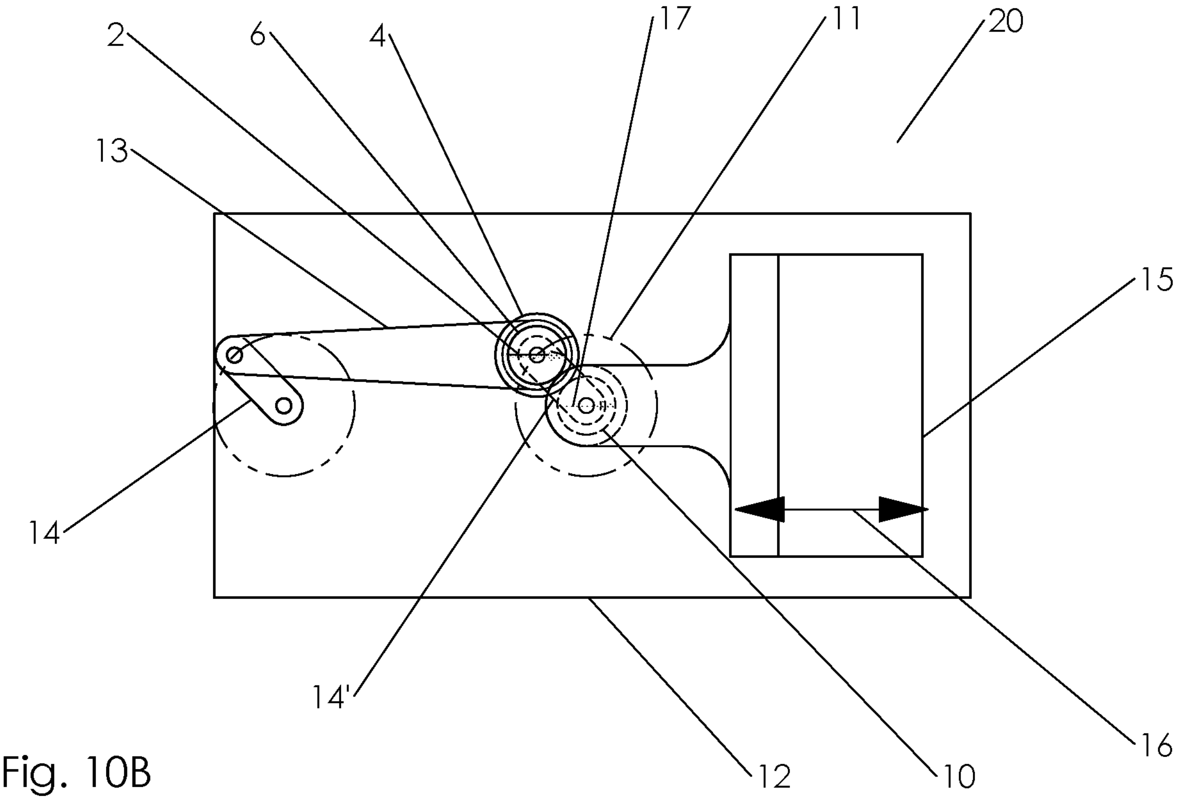
Figure 10C:
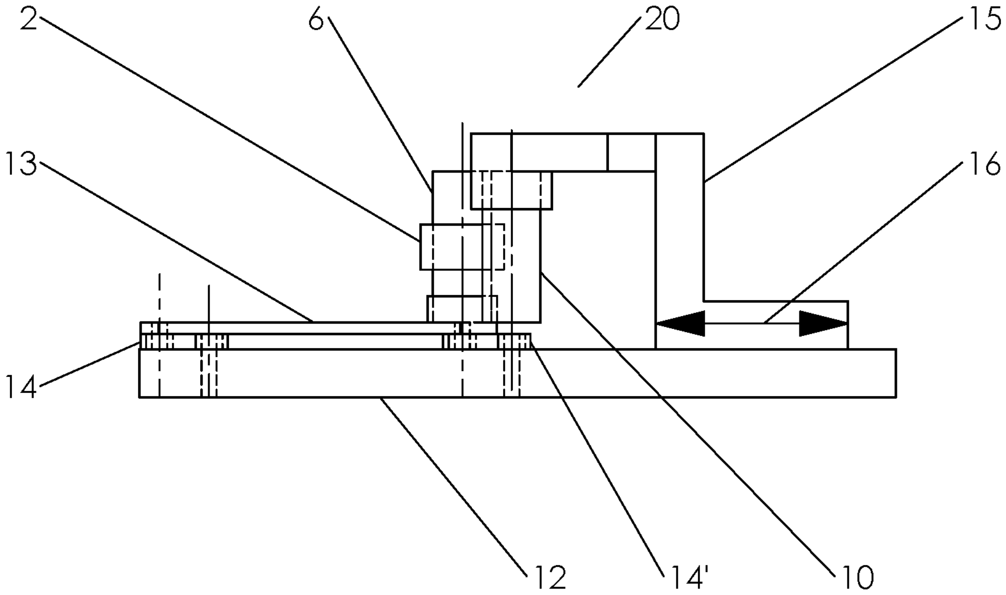
Figure 11:
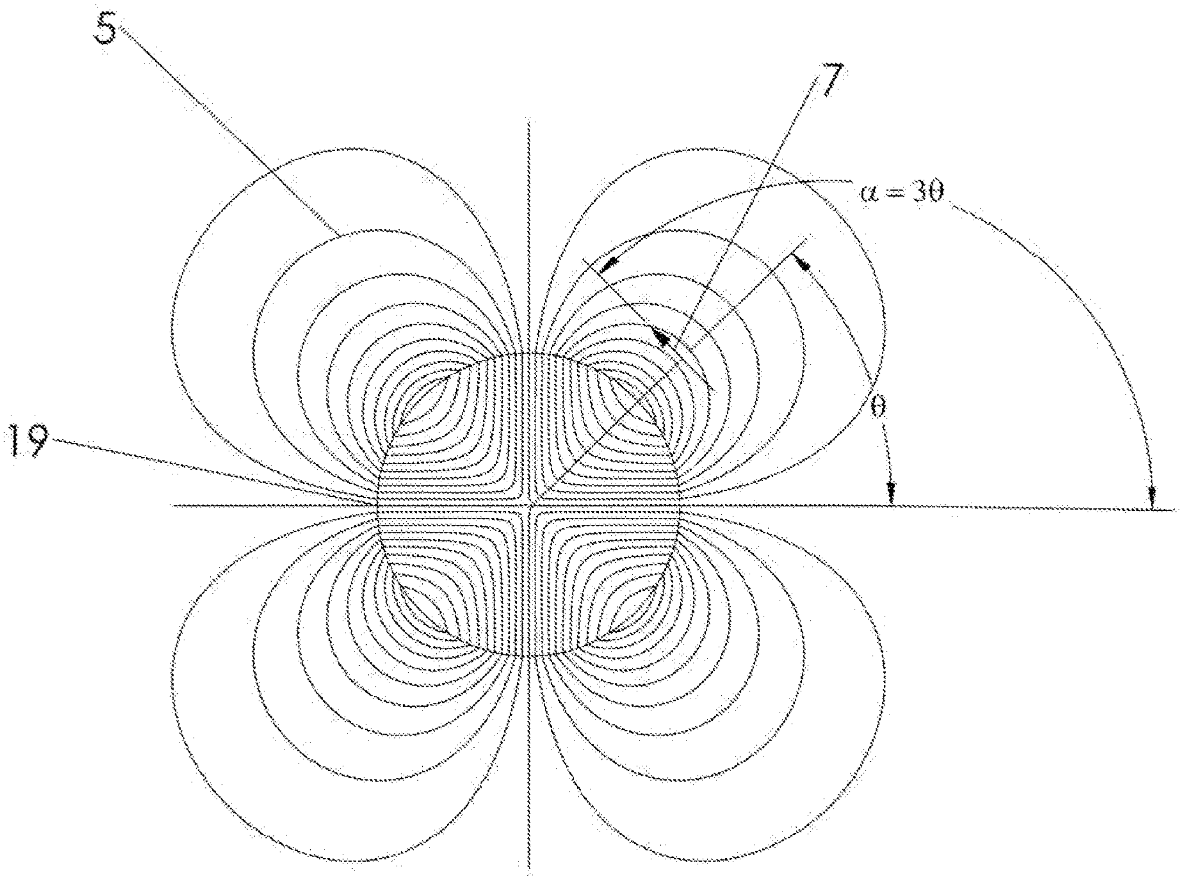
Figure 12:
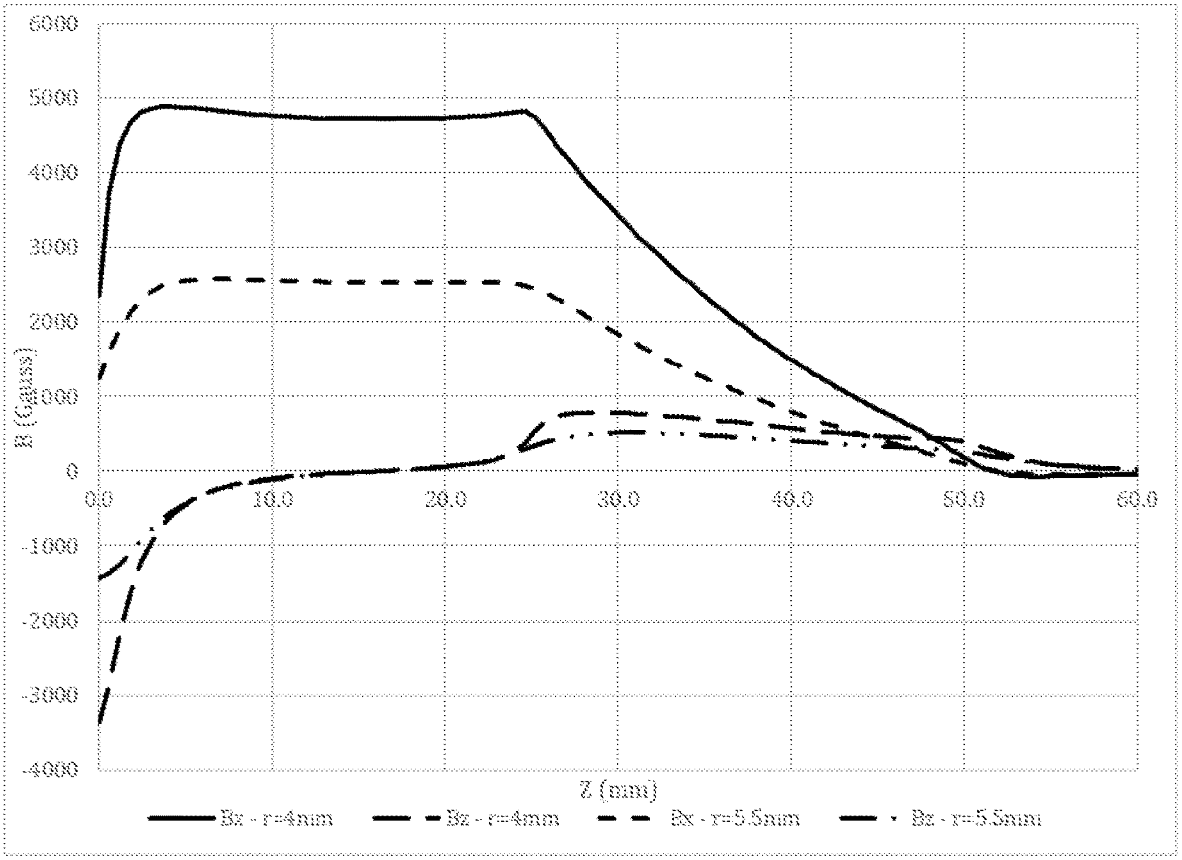

FIG. 4*a* is an isometric view of a first embodiment of a simple apparatus according to the present invention;

FIG. 4*b* is an isometric view of a second embodiment of an apparatus according to the invention, in which a first end of a diametrically magnetized insertion rod is tapered;

FIG. 4*c* is an isometric view of an alternative embodiment of an apparatus according to the present invention, in which a nonmagnetic cover is disposable over or around a tapered end of a diametrically magnetized insertion rod (e.g., per FIG. 4*b*);

FIG. 4*d* is an isometric view of an alternative embodiment of the apparatus according to the invention, in which both a first end and a second end of the diametrically magnetized insertion rod are tapered;

FIG. 4*e* is an isometric view of an alternative embodiment of the apparatus according to the invention, in which a nonmagnetic cover is disposable over or around both (or either) tapered ends of a diametrically magnetized insertion rod (e.g., per FIG. 4*d*);

FIG. 5 is a diagrammatic section view of an alternative embodiment of the invention, illustrating how a diametrically magnetized contact rod may be utilized to increase the strength of the magnetizing field imparted to an annular Halbach ring, the contact rod shown in three different positions as it may consecutively appear in the course of a revolution of the contact rod in relation to an annular ring;

FIG. 6 depicts the flux from a diametrically magnetized insertion rod combined with the flux from a magnetized contact rod of the same diameter, the two rods placed in proximity;

FIG. 7 depicts the flux from a diametrically magnetized insertion rod combined with the flux from a magnetized contact rod of a smaller diameter, the former situated within the aperture of an annular ring (shown in broken lines) and the latter in a first position contacting an outer peripheral surface of the annular ring;

FIG. 8 is related to FIG. 7, and depicts the flux from the diametrically magnetized rod combined with the flux from the magnetized contact rod of smaller diameter, with the contact rod at a first subsequent position after one-eighth of a complete counter-clockwise revolution of the contact rod around the annular ring;

FIG. 9 is related to FIG. 8, and depicts shows the flux from a diametrically magnetized rod combined with the flux from a second rod of smaller diameter, with the contact rod at a second subsequent position after one-fourth of a complete revolution of the contact rod around the annular ring;

FIG. 10A is a perspective view of an embodiment of a system according to the present invention for moving the two magnetized rods and annular ring in a relative revolution motion required for magnetizing the annular ring;

FIG. 10B is a top view of the system seen in FIG. 10A;

FIG. 10C is a side view of the system seen in FIG. 10A;

FIG. 11 depicts the lines of flux emanating from a rod magnetized as a quadrupole; and FIG. 12 is a graphical plot of magnetic strengths (in Gauss) Bx and Bz, as a function of Z and on the Y=0 plane, at radial distances of 4 mm and 5.5 mm corresponding to the inner diameter and outer diameter of an example annular ring to be magnetized.

Repeated use of reference characters in the present specification and drawings is intended to represent the same or analogous features or elements of the present invention. The views are not necessarily to scale, either within a single figure or between drawing figures.

DETAILED DESCRIPTION

Reference now will be made in detail to embodiments of the invention, one or more examples of which are illustrated in the accompanying drawings. Each example is provided by way of explanation of the invention, not limitation of the invention—resort being made to the claims for limitation.

The invention disclosed hereby includes apparatuses, methods, and systems providing a more efficient and effective means and mode for imparting Halbach's magnetization to target objects. In several embodiments of the invention, due partially to cost effective production, a plastic bonded magnet material is used to compose a target object. Target objects preferably are annular rings, and the rings may be made from a plastic bonded material which can be pressed into a monobloc ring. Hereafter, including in the claims, "annular ring" and "ring" include annular cylinders of any axial length. "Monobloc" herein means a block or casting made in a single piece, in the sense of unitary or integral, rather than being assembled from separable or discrete components. A monobloc may be plastic bonded materials including a mix of magnetic powder with a binder. Magnetic powders are those known in the art, including one or more of neodymium-boron-iron, samarium cobalt, ceramic ferrite, and alnico, but not excluding other ferrites and iron oxides and compounds thereof. In the practice of the invention, the anisotropy direction of the magnetic powder can initially be randomly oriented throughout the ring. The ring can be created by, for example, press or injection molding. The ratio of binder to magnet powder controls the overall magnetic performance, and this ratio may be deliberately selected based on the intended end use of the target object and target material. Then, in various embodiments of the invention, there is impressed in the target object, preferably a unitary annular ring, a continuously varying orientation of magnetization according the Halbach's formula. A magnetized Halbach ring is provided, in this invention, which produces or generate an intense magnetic field confined mostly within the bore of the annular ring, with relatively weak field outside the ring. The difficulty in creating a uniform field distribution in the bore of an annular ring is twofold. First, if electrical currents alone are utilized, then all these currents must be confined to the bore of the annular ring. For small bore diameters the current densities required to produce fields strong enough to magnetize the ring are not realizable and/or feasible. Second, it is not possible to use a high permeability material, such as low carbon steel, to shape the field in the manner required. The present invention overcomes these difficulties to permit the magnetization of a monobloc annular ring manifesting a strong uniform field within the central aperture or bore of the ring.

Because of symmetry (in two dimensions) around the annulus's central axis, the determination of the field from the annulus can be treated as two-dimensional (while ignoring end effects at the terminus of an annular cylinder). Calculation often is executed in plane-polar coordinates (r, θ), using associated unit vectors $\hat{r}$ and $\hat{\theta}$. The annulus body has an inside radius and an outside radius, thus radial extent $r_i<r<r_o$. The target object is magnetized with a continuously varying orientation according to the formula given by Halbach, that is, $\alpha=2N\theta+\alpha_0$, where α is the angle, relative to an x-axis, of the magnetization direction, $\alpha_0$ is the angle of magnetization on the positive x axis, and N=1 in the case of a dipole.

In cases of a dipole (N=1) and in accordance with the invention, a magnetized magnet rod is used that is inserted into (and then removed from) the bore of the target ring to be magnetized. In some cases of a dipole (N=1) and in preferred embodiments a magnetized permanent magnet rod is used that, when inserted, fills the bore of the ring to be magnetized. Any magnetized rod that fills the bore of the ring may be suited to the apparatus and method. A magnetized rod according to the invention preferably is cylindrical, although a rod of non-circular cross sections may be adapted for use.

Fields external to a magnetized rod obey the easy axis rotation formulas given by Halbach as shown immediately below. "M" is the remanence of the PM material the rod is composed of, while "r" is the radial distance from the rod axis, and "a" is the radius of the rod. (See also FIG. 3.)

$$\overrightarrow{B(r,\theta)} = \frac{Ma^2}{2r^2}\left(\cos\theta\hat{r} + \sin\theta\hat{\theta}\right) = \frac{Ma^2}{2r^2}\left[\left(x^2 - y^2\right)\hat{x} + 2xy\hat{y}\right] = \frac{Ma^2}{2r^2}\left[\left(\cos^2\theta - \theta\right)\hat{x} + 2\cos\theta\sin\theta\hat{y}\right] = \frac{Ma^2}{2r^2}(\cos 2\theta\hat{x} + \sin 2\theta\hat{y}) \quad [1]$$

and $$\alpha = \tan^{-1}\left(\frac{\sin 2\theta}{\cos 2\theta}\right) = 2\theta \quad [2]$$

The first term above is expressed in cylindrical coordinates, while the second is expressed cartesian coordinates so the field direction (α) as a function of theta (θ) can be derived.

From the above equation the field strength at the surface of a rod, such as an insertion rod or contact rod according to the invention, is equal to one-half the remanence (M) of the PM (permanent magnet) material from which it is composed. Values of field strength on the surface on the order of 0.7 Tesla are achievable for a rod made from N52 grade neodymium-boron-iron, which has a remanence of 1.4 Tesla. The PM material of the target object to be magnetized needs to have an intrinsic coercive force (Hci) of less than one-half to one-third of the field strength on the surface of the magnetized rod in order for the target object to obtain saturation (full magnetization).

During the practice of the invention, care preferably is taken while removing the object from the insertion rod. If insertion rod withdrawal is not implemented properly, fringe fields at the end of the insertion rod imprint orientations within the ring that are not in the ideal direction. The invention addresses this concern in some embodiments by incorporating insertion rods that have gradual tapering on at least one end of the insertion rod. In various embodiments, the tapering can be done on one or both ends of the insertion rod.

In various embodiments of the invention, a diametrically magnetized rod may be used to orient the object while the object is being pressed or molded into final form. In such embodiments at least some of the fabrication tooling is made from nonmagnetic material(s).

A single internal diametrically magnetized rod, acting as an insertion rod as described herein, is sufficient for target objects comprising annular rings of relatively thin walls. However, the amplitude of the field from the magnetizing rod decays as $(a/r)^2$. The field level at the outer regions of radially thick annular rings is normally insufficient to saturate the material of the annular ring. To enable an increase in the radial wall thickness that can be saturated according to this invention, a magnetized rod optionally may be used, as needed, externally of the annular ring. This externally applied rod is identified herein as the "contact rod," and can be diametrically magnetized. The magnetization of the insertion rod and contact rod preferably match each other. For example, if the contact rod is diametrically magnetized, then so will be the insertion rod. In various embodiments of the invention, the contact rod is held tangent to the target ring to be magnetized, with the contact rod's magnetization field direction maintained parallel to the direction of the ring's field. This parallel relation is maintained as the contact rod completes a complete revolution around the target object. The contact rod may be of the same diameter of the insertion rod, or of a larger or smaller diameter, to optimize the magnetizing field applied to the target. Thus the two magnetized rods may have equal diameters or unequal diameters, and in the case of unequal diameters the contract rod preferably has the smaller diameter.

The discussion above pertains to a dipolar ring (N=1), but can be extended by those skilled in the art to higher order fields, N=2 and above. In the case of N=2 the magnetizing rod would need an internal magnetization of a quadrupole. In some embodiments of the invention, additional improvement in performance is achieved by utilized various shaped magnets, such as the tapered magnets described above. In some embodiments of the invention, additional improvements in performance are achieved by including one or more additional magnets.

In some embodiments of the invention, multiple magnets of varying sizes may be used. In alternative of these embodiments the magnets may also vary by locations. Also, individual magnet elements may be independently moved, rotated, translated, or otherwise manipulated in a manner or manners to facilitate the optimal operation of the apparatus. In some embodiments of the invention, multiple magnets may share a common orientation. Further, multiple magnets may be nested. In some embodiments of the invention, multiple magnets may have shared axes of rotation. In some embodiments of the invention, multiple magnets may have independent axes of rotation, parallel or skewed.

Figure 1:
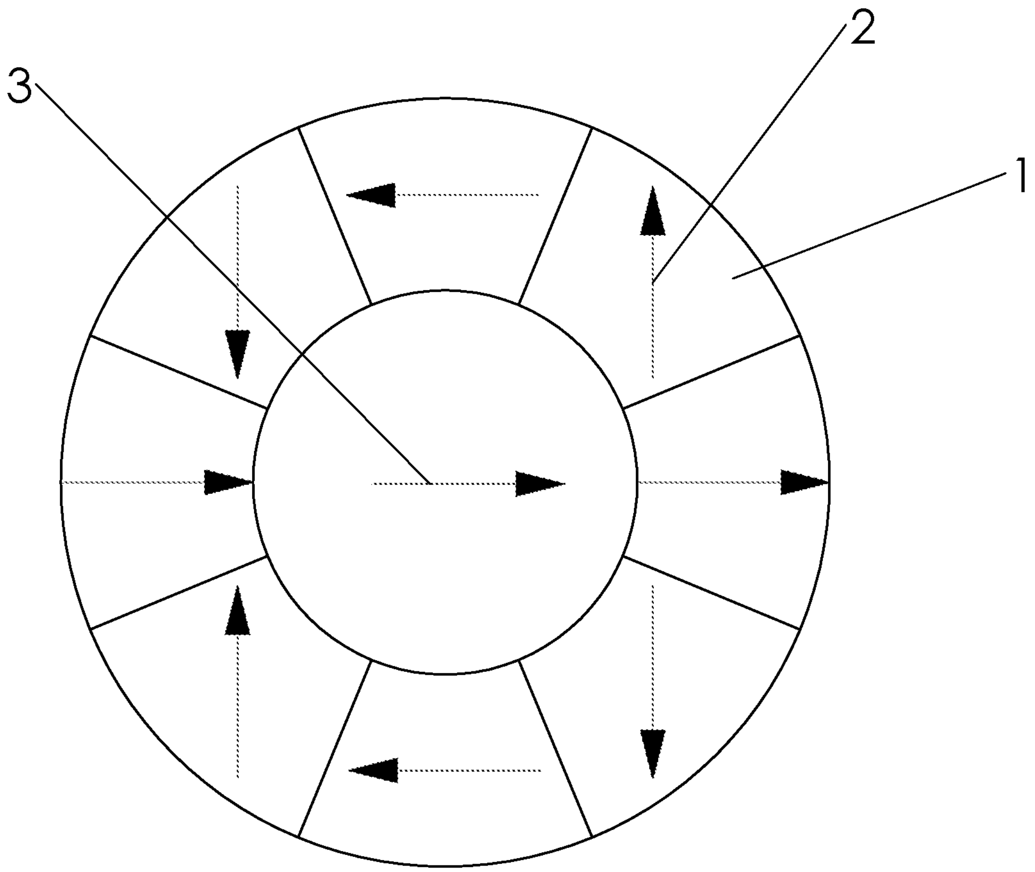
Fig. 1 (PRIOR ART)
FIG. 1 is a transverse (radial) sectional diagram of segmented annular dipolar Halbach array according to the prior art.

Additional disclosure of the invention is facilitated by reference to the drawing figures. FIG. 1 depicts a dipole Halbach array according to the prior art, divided into eight geometrically identical segments 1. The segments 1 are individual pieces, fabricated separately and then assembled according to conventional Halbach annular array processes. The magnetization direction 2 of each individual segment is uniform throughout, and advances by $2\pi/8$ from one piece to the next. This produces a main field 3. FIG. 1 shows the example case of case N=1 and M=8 according to known Halbach formulae. Each segment 1 is magnetized individually and assembled in the magnetized state. Opposing magnetic forces must be overcome during the assembly process. The present invention avoids the disadvantages of assembling a Halbach cylinder from discrete pieces or segments.

Figure 2:
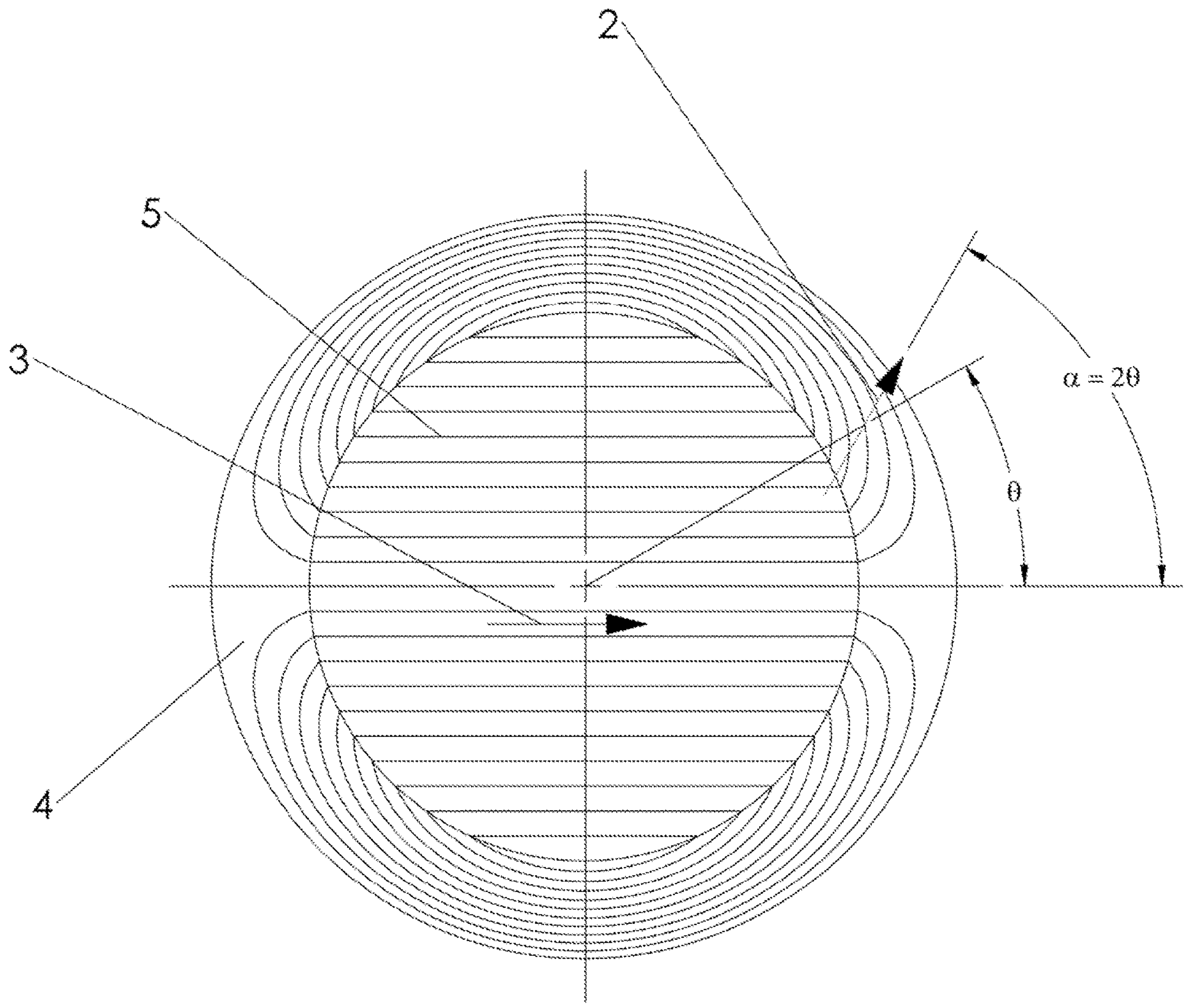
FIG. 2 is a transverse sectional diagram illustrating the flux from an annular dipolar Halbach ring with continuously varying magnetization.

Attention is invited to FIG. 2, illustrating diagrammatically a permanent magnet annular ring 4, per the present invention, of inside radius $r_i$ and outside radius of $r_o$, and with a field having continuously varying magnetization direction 2 according to the Halbach formula for N=1. In FIG. 2, the central axis of the annular ring 4 is normal to the plane of the paper, and is defined at the intersection of the two imaginary perpendicular cartesian axes shown in the figure. An "annular ring" typically is a coaxial cylinder. In two dimensions (and in an ideal case ignoring end effects at the axial termini of the annular ring), this generates a uniform dipole field 3 internal to the ring 4 (transverse to the ring's bore) with no field external to the ring. FIG. 2 illustrates that all the lines of flux 5 "return" inside the magnet material of the annular ring 4. The field strength internal to the ring 4 is given by $B=Br*\ln(r_o/r_i)$ where Br is the remanent field of the permanent magnet material (as described, e.g., in Halbach's paper).

Figure 3:
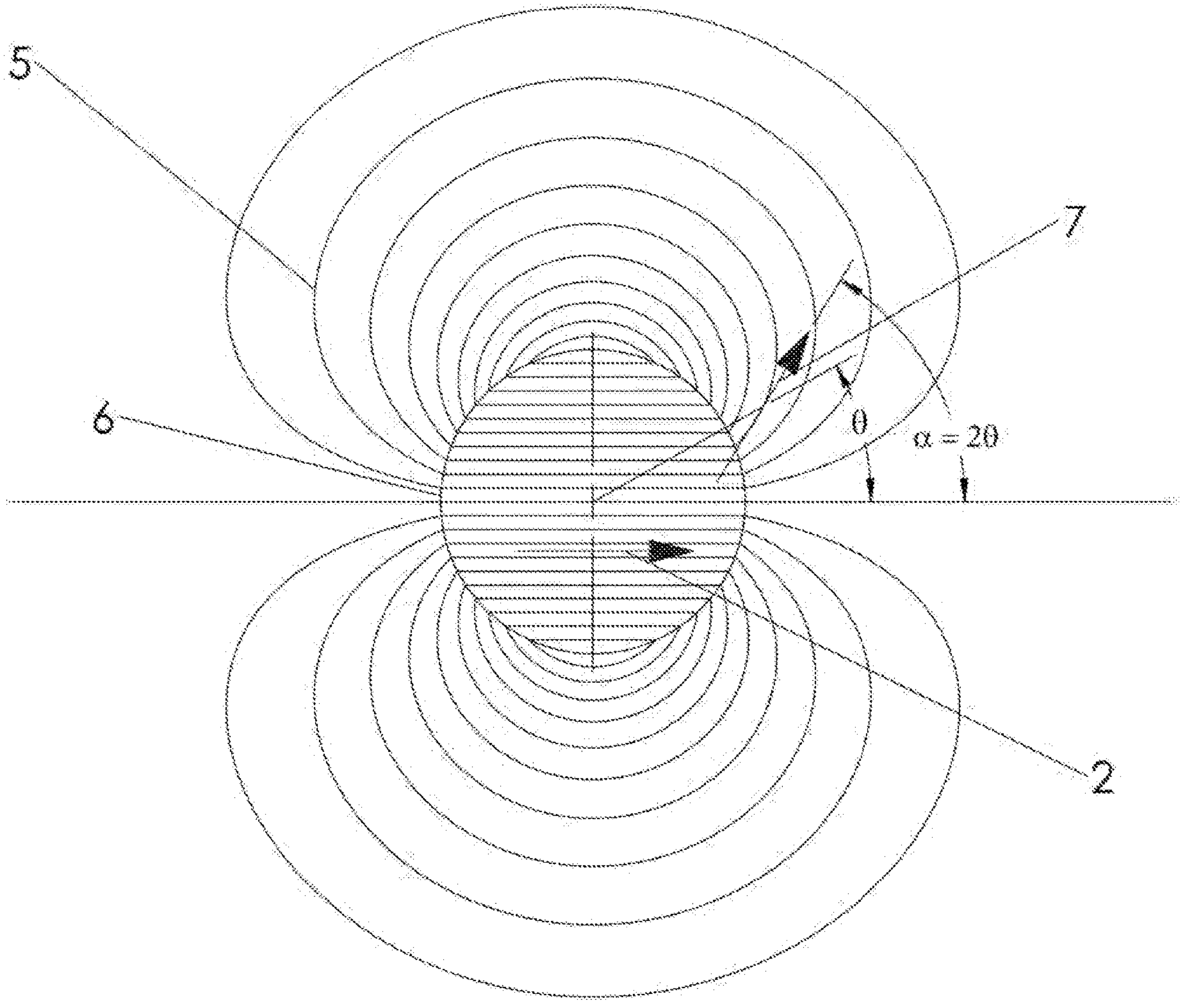
FIG. 3 is a transverse sectional view of a diametrically magnetized insertion or contact rod according to the invention, illustrating the magnetic flux thereof.

FIG. 3 shows a diametrically magnetized rod 6 and its lines of flux 5. In the figure, the central axis of the rod 6 is normal to the plane of the paper, and is defined at the intersection of the two perpendicular imaginary cartesian axes depicted in the figure. The direction of the field 7 external to the rod 6 is at an angle $\alpha$. The angle $\alpha$ varies as $2\theta$ and obeys the easy axis rotation formula given by Halbach as shown above. (In FIG. 3, the rotation of the easy axes is considered to be counterclockwise about the central axis of the rod 6 according to convention, and as suggested by the figure.)

Reference is made to FIG. 4*a*, offering an isometric view of a first and basic embodiment of the apparatus according to the invention, depicting an annular ring 4 to be magnetized with and by the diametrically magnetized insertion rod 6 inserted into the bore of the ring. Herein and in the claims, this insertion rod sometimes is referred to as a "first" rod. The insertion rod 6 preferably but not necessarily is cylindrical with a longitudinal axis. The annular ring 4 preferably is a coaxial cylinder, also having a central axis. The annular ring 4 is magnetized when the rod 6 is slidably inserted into the bore of the ring 4 as indicated in FIG. 4*a*, i.e., this first rod 6 imparts magnetism to the annular ring so that the annular ring generates a dipolar magnetic field after the first rod is removed from the bore. When inserted, the insertion rod 6 may substantially fill or occupy the ring's bore as suggested by the figure, but this is not a strict requirement. In a preferred embodiment, the insertion rod 6 is inserted coaxially to the ring 4, with the insertion accomplished by a translation motion. (Typically either the rod 6 translates back and forth relative to an unmoving ring 4, or the ring 4 translates coaxially with respect to a motionless rod 6.)

Alternatively, the coaxial translation may be unidirectional, i.e., the insertion rod 6 enters the bore from one side of the ring 4 and emerges and departs from the bore from the other side.

The external fields produced by the insertion rod 6 are in the proper direction for magnetizing the ring 4 in a pattern to impose a dipolar field in the substance of the ring. The strength of the fields produced by the rod 6 must be high enough to impart magnetism to the particular grade and type of magnet material of which the ring 4 is composed. The composition of the target annular ring 4 may be bonded or injection molded neodymium boron iron, ceramic ferrite, samarium cobalt, or alnico. Those skilled in the art recognize that there may be other suitable ring compositions that may be magnetized according to the means and modes of the present invention.

FIG. 4*b* is an isometric view of an alternative embodiment of the apparatus according to the invention. In this embodiment, a first end 8 of the diametrically magnetized insertion rod 6 is gradually tapered. The taper progressively reduces the diameter of the rod 6, from the rod's full diameter, as the absolute end of the rod is approached. The tapering of the insertion rod end 8 reduces the rod's strength of field imposed into the volume of the annular ring 4 as the rod is inserted into, and especially as it is removed from, the bore of the ring. The insertion rod's taper thus advantageously ameliorates the strong fringe fields generated from an un-tapered rod end—which fringe fields are not in the proper direction to produce a dipolar field in the ring 4—and which during removal of the insertion rod 6 can deleteriously disturb the uniformity of ring magnetization created while the rod was fully within the ring's bore.

FIG. 4*c* is an isometric view of an alternative aspect or embodiment of an apparatus or according to the invention. This alternative embodiment adds to the embodiment of FIG. 4*b* a cover 9 over and around the tapered end 8 of the diametrically magnetized rod 6. The cover 9 is composed of nonmagnetic (po (relative permeability) very nearly equal to 1) material, such as nonmagnetic metals and plastics. During the practice of the invention to magnetize the annular ring 4, the cover 9 is attached to the rod 6. (But the cover 9 optionally is controllably removably attachable/detachable to the insertion rod 6.) Cover 9 serves to keep the insertion rod 6 centered within bore of the ring 4 while the rod is inserted or removed from the bore, so to maintain optimal field directions for magnetization of the ring. It is contemplated that the insertion rod 6 is translated mechanically into and from the bore, and the presence of a tapered end 8 may complicate a smoothly co-axial translation. Such a complication is advantageously avoided by the cover 9 having an exterior diameter equal or nearly equal to the diameter of the rod 6.

An isometric view of another alternative embodiment of an apparatus according to the invention is provided in FIG. 4*d*. This embodiment is related to the embodiment seen in FIG. 4*b*, but in this embodiment both ends, a first end and a second end, of the diametrically magnetized insertion rod 18 are tapered in the manner explained with reference to FIG. 4*b*. This dually tapered insertion rod 18 reduces the rod's strength of field imposed into the volume of the annular ring 4 as the rod 18 is inserted into the bore of the ring, and particularly also while the rod is being removed from the bore of the ring. This avoids the strong fringe fields that exist in an un-tapered rod end and that are not in the proper direction to produce a uniform dipolar field in the ring 4. The embodiment of the insertion rod 18 shown in FIG. 4*d* allows the rod 18 to be withdrawn from the bore of the ring 4 in either direction. The embodiment of FIG. 4*d* advantageously may be inserted into, and then removed from, the bore of the ring 4 without the need for a to-and-fro reciprocation; rather, translation can be unidirectional along the coaxes.

FIG. 4*e* is an isometric view of yet another alternative embodiment of the apparatus according to the present invention. This embodiment is related to the embodiment seen in FIG. 4*c*, but in this embodiment a nonmagnetic cover 9 is provided over each of the respective tapered ends, the tapered first end and the tapered second end, of the diametrically magnetized rod 18 seen in FIG. 4*d*. The two end covers 9 serve to keep the insertion rod 18 centered coaxially in the bore of the ring 4 as the rod is removed either direction from within the bore—or as the ring 4 is removed either direction from its situation surrounding the rod 18—so to maintain the most favorable field directions for magnetization of the ring during translation of the rod and ring relative to one another.

Attention is invited now to FIG. 5, showing is an alternative embodiment of the invention, including a system and method for increased the magnetizing fields imposed into target objects, particularly annular rings 4, composed from materials having relatively higher coercivity and/or rings of thick radial dimensions (between inner and outer radii). In the system of FIG. 5, two diametrically magnetized rods are deployed, a magnetized insertion rod and a magnetized contact rod; the former is insertable into the ring bore, while the latter is contactable with the outside peripheral surface of the annular ring 4. In one preferred embodiment, the annular ring 4 to be magnetized is placed over the diametrically magnetized insertion rod 6. A diametrically magnetized contact rod 10 is placed with its outside surface touching the annular ring 4. The contact rod 10 is sometimes referred to herein as the "second" rod. The contact rod's direction of magnetization 17 is maintained parallel to the direction of the field 2 of the insertion rod 6. The contact rod 10 is moved in a circular path 11 for one complete revolution while the direction of magnetization 17 remains parallel to that direction 2 of the insertion rod 6. Revolution of the contact rod 10 can be either clockwise or counterclockwise in FIG. 5. This arrangement provides up to twice the magnetizing field of a single magnetized rod arrangement (e.g., a single insertion rod 6 alone).

In FIG. 6 the lines of the flux 5 from the paired diametrically magnetized insertion rod 6, and diametrically magnetized contact rod 10 of equal diameter, at one position are shown. The region between the rods 6, 10, the "maximum region," experiences from the two rods up to twice the field strength of an insertion rod 6 alone, and is in the field direction 7 needed to create a dipolar field in the annular ring 4 along a line between the centers of the insertion and contact rods. Thus FIG. 6 shows how a portion of the ring 4 situated between the two rods 6, 10 undergoes the influence of a beneficially increased magnetic field. The stronger field is adequate to impress magnetization into such intermediate portion of the ring, so that a portion of the ring having a relatively large radial dimension r (between $r_i$ and $r_o$) is magnetized. By revolving the contact rod 10 around the ring 4 while maintaining the respective magnetized rod field directions 2 and 17 in parallel relation, the full ring can be magnetized around its full circumference.

FIG. 7 is similar to FIG. 6, but shows the lines of flux 5 from an alternate embodiment of the invention in which the contact rod 10 is diametrically magnetized and has a smaller diameter than the insertion rod 6. (In both FIGS. 6 and 7, the contact rod 10 is shown in one selected or example first positional location; during the practice of the invention, there is a revolution motion of the contact rod in relation to the ring 4.) Again in FIG. 7, the intermediate region between the rods 6, 10, has up to twice the field strength of the insertion rod 6 alone and is in the direction 7 needed to create a dipolar field in the substance of the annular ring 4. In the figure, the field direction 7 of the second diametrically magnetizing rod 10 is along a line between the centers of the two rods. The second rod's field deviates from the ideal direction 7 as one "moves away" from this line. Using a smaller diameter contact rod 10, however, allows for its contribution to the magnetizing field to fall below the value needed to magnetize the annular ring 4 as the direction deviates from the ideal. The ratio of the respective diameters of the rods 6, 10, can be optimized based on the thickness of the ring 4 and the field strength required to magnetize the particular magnet material of which the target object is composed.

FIG. 8 is related to FIG. 7, and shows the lines of flux with the smaller diametrically magnetized rod 10 in it a second position relative to the ring 4 after having completed one-eighth of a rotation (i.e., a procession of 45° from its initial position of FIG. 7) around the annular ring 4. As the contact rod 10 is revolved continuously around the ring 4, its direction of magnetization 17 is maintained parallel to the direction 2 of the diametrically magnetized insertion rod 6. The field direction 7 in the space between the rods 6 and 10 is vertical on an imaginary line between the centers of the two rods, and is the direction required to create the dipolar field in the annular ring 4.

FIG. 9 is related to FIG. 8, and illustrates the lines of magnetic flux in the system, with the smaller diametrically magnetized contact rod 10 having completed one-fourth (90°) a revolution around the annular ring 4. The direction of the contact rod's magnetization 17 being held parallel to that of the first diametrically magnetized rod 6, as shown. The intermediate field direction 7 is horizontal on the line between the centers of the two rods 6, 10, and is in the direction required to produce a dipolar field in the annular ring 4. The motion of the smaller contact rod 10 is through one complete revolution around the annular ring 4, thereby to fully magnetize substance of the annular ring 4.

As is apparent from the foregoing, the contact rod 10 eventually is revolved 360° around the ring 4, with such a complete revolution restoring the contact rod to its position seen in FIG. 7. The direction of the contact rod's magnetization 17 is maintained parallel to the magnetization direction 2 of the insertion rod 6 throughout the revolution. During a complete revolution, the contact rod's motion preferably is continuous, without interruption, so to promote uniformity in the dipolar magnetization of the annular ring 4. During the motion of the contact rod 10 relative to the ring 4, the exterior of the contact rod preferably is held in a sliding contact with the exterior peripheral surface of the ring 4.

In the course of the complete revolution the fields emanating from the rods 6, 10 magnetize the full ring, impressing it with a dipolar field. A person skilled in the art recognizes that the motion of the contact rod 10 in relation to the ring 4 and insert rod 6 is relative; rather than the rod 6 and ring 4 being stationary while the contact rod 10 revolves, it is recognized that an alternative—if perhaps mechanically more complex—embodiment of the system may have the contact rod's location fixed in space while the insert rod and the ring revolve concurrently together around the contact rod.

Attention is advanced to FIG. 10A, an isometric and diagrammatic view of an example mechanical apparatus or system 20 for moving the two diametrically magnetized rods 6, 10, and the annular ring 4, in the relative motion required for imparting continuous magnetization in the ring. The mechanical system 20 includes a parallel crank four-bar mechanism. The base 12 functions effectively as a fixed link. A first proximal end of the first short link 14 has a rotatable connection to the base 12, while the distal, second, end of the first short link has a rotatable connection with a first end of the long link 13. These two respective (vertical) axes of rotation are illustrated in FIGS. 10A and 10C. The axis of rotation for the first end of the short link 14 is fixed relative to the base 12 while, during the practice of the invention, the axis of rotation shared by the second end of the first short link and the first end of the long link 13 revolves around, parallel to, the short link's first end axis of rotation on the base 12, as suggested by the phantom line circle at the left side of FIG. 10B. Additionally, the second end of the long link 13 has a rotational connection with a first end of the second short link 14' their common vertical axis of rotation seen as a broken line in FIGS. 10A and 10C. The linkage comprising the four-bar mechanism is completed with the rotational connection of the second end of the second short link 14' to the base 12. The axis of rotation for the second end of the second short link 14' is fixed relative to the base 12 while, during the practice of the invention, the axis of rotation shared by the second end of the long link 14 and the first end of the second short link 14' revolves around, parallel to, the second short link's second end axis of rotation on the base 12, as suggested by the largest phantom line circle 11 toward the right side of FIG. 10B. (See also path 11 in FIG. 5.)

The magnetized insertion rod 6 and the annular ring 4 are removably attached to the long link 13 in any suitable manner; in the example of FIGS. 10A-C the bottom of the insertion rod 6 is secured in a circular socket near the second end of the long link 13. The insertion rod 6 is within the bore of the ring 4 while the ring is maintained in the illustrated position surrounding the outside of the insertion rod. The long link 13 holds the magnetization direction 2 of the insertion rod 6 parallel to the longitudinal horizontal axis of the long link 13. The two short links 14, 14' hold the long link 13 parallel to the magnetization direction 17 of the contact rod 10. The contact rod 10 in turn is held in position by the magnet holder 15 while the four-bar mechanism revolves the insertion rod 6 (with the annular ring 4 around it) around the contact rod. During revolution movement of the insertion rod 6 and of the ring 4, the magnet holder 15 temporarily but reliably secures the contact rod 10 in position. The magnet holder 15 can be controllably moved into and out of contact with the annular ring 4; contact rod 10 moves with magnet holder 15 to allow removal and insertion of the annular ring onto the insertion rod 6, as indicated by the double-headed directional arrows 16 in FIGS. 10A-C.

FIG. 10B supplies a top view of the mechanical system 20, showing the circular path 11 of the annular ring 4 and magnetized insertion rod 6 around the fixed-in-position magnetized contact rod 10. Path 11 is traced by the vertical axis of rotation shared by the second end of the long link 13 and the first end of the second short link 14' as that axis revolves around the vertical central axis of the contact rod 10.

FIG. 10C is a front view of the mechanical system 20. While not shown in FIGS. 10A-C, one or both ends of the diametrically magnetized insertion rod 6 can be tapered, and with or without a nonmagnetic cover, to prevent exposure of the annular ring 4 to fields not in the optimum direction for imparting magnetization as described previously hereinabove.

FIG. 11 shows the lines of flux emanating from a quadrupole magnetized insertion rod 19. The direction of the field 7 external to the rod 19 is at an angle α. The angle α goes as βθ and obeys the easy axis rotation formula given by Halbach for a ring to generate a quadrupole field N=2 internal to the ring.

In the foregoing disclosure, and in construing the claims, a person skilled in the art recognizes that movement of one element of the invention with respect to another element is relative. For instance, the insertion rod 6 may be inserted and withdrawn from the bore of the annular ring 4 by holding the annular ring in a fixed position in space while moving the insertion rod; or the insertion rod may be maintained immobile in space while the annular ring is moved relative to the insertion rod to insert and withdraw the insertion for from the bore. Still further, it is within the scope of the invention to move concurrently both the insertion rod 6 and the annular 4 ring so to insert and withdraw the rod into and from out of the ring's bore. Further, the annular ring 4 may be held in a fixed position in space while the contact rod 10 is moved to revolve around the immobile annular ring, or alternatively, the scope of the invention includes an embodiment in which the contact rod 10 does not move in 3-D space while the annular ring 4 is revolved around the contact rod (e.g., while maintaining a slight sliding contact between them).

Those skilled in the art will realize that FIGS. 10A-C depict but one basic possible mechanical apparatus 20 that can be used to hold and move the two diametrically magnetized rods 6, 10 in the relative motion required for continuous magnetization of the ring 4. Moreover, the entire apparatus 20 can be oriented in 3-D space differently than as shown in FIGS. 10A-C. For example, the base 12 could be disposed vertically so that all the axes of rotation are oriented horizontally.

In an exemplary instance of the invention, an embodiment of the annular ring has an inside diameter $r_i$ of 8 mm, an outside diameter $r_o$ of 11 mm, and a length of 6.5 mm. The ring is composed of alnico and a binder that is compression bonded to final form. The ratio of alnico to binder is chosen to produce a Br of about 1900 Gauss, He of 420 oersted (Ge), and Hci of 550 Oe. This blend requires a magnetizing field of nominally three times Hci, or 1650 Oe as a minimum. It is undesirable to have a Z component of magnetization imparted to the annular ring. Restricting the Z component of field from the magnetizing rod to 1000 Oe or below prevents this from happening.

FIG. 12 plots Bx and Bz on the Y=0 plane, as a function of Z, at a radius of 4 mm and 5.5 mm, corresponding to the inner and outer diameter of the annular ring to be magnetized. A diametrically magnetized tapered insertion rod for this example is of diameter 6.5 mm, overall length of 50 mm, and having a 25 mm long end section that tapers to 2 mm diameter. The diameter of the insertion rod is less than maximum that would fit the inside diameter of the annular ring. The insertion rod is sintered grade N52 neodymium-iron-boron. Z=0 is the un-tapered end of the rod. Both Bx and Bz approach zero as the Z distance approaches 60 mm. Having the Z=0 end of the insertion rod enter or exit the annular ring imparts Z field components larger than 1000 Oe, and is therefore not desirable. It is also clear that having the tapered end of the insertion rod enter or exit the annular ring, the Z field component in less than the value that would impart undesirable magnetization to the annular ring.

It will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, including in the claims, the term "and/or," when used in a list of two or more items, means that any one of the listed items can be employed by itself, or any combination of two or more of the listed items can be employed. For example, if an assembly is characterized as containing components A, B, and/or C, the assembly can contain A alone; B alone; C alone; A and B in combination; A and C in combination; B and C in combination; or A, B, and C in combination. The description set forth herein, in connection with the appended drawings, describes example configurations and does not represent all the examples that may be implemented or that are within the scope of the claims. The term "exemplary" used herein means "serving as an example," and not "preferred."

LIST OF REFERENCE NUMERALS

1. Permanent magnet segment
2. Magnetic direction
3. Main field direction (in bore of ring)
4. Annular ring of permanent magnet material
5. Lines of flux
6. Magnetized insertion rod
7. Field direction
8. Tapered end of magnetized insertion rod
9. Nonmagnetic cover
10. Magnetized contact rod
11. Movement path of magnetized contact rod
12. Base
13. Long link
14. First short link
14'. Second short link
15. Magnet holder
16. Motion of magnet holder
17. Magnetic direction of contact rod
18. Diametrically magnetized rod with both ends tapered
19. Insertion rod magnetized as quadrupole
20. System for moving rods

I claim:

1. A system for magnetizing a target object according to Halbach's formula, the system comprising:

a non-magnetic annular ring having an axis, a bore therethrough and a circumferential periphery; and a magnetized first rod movably insertable into the bore whereby the annular ring is magnetized to generate a multipole field in the bore.

2. The system according to claim 1 wherein the magnetized first rod is diametrically magnetized and the annular ring, when magnetized, generates a dipolar magnetic field after the magnetized first rod is removed from the bore.

3. The system according to claim 2 wherein the annular ring comprises a monobloc comprising a mix of magnetic powder with a binder.

4. The system according to claim 3 wherein:

the monobloc is bonded or injection molded; and the magnetic powder comprises at least one substance selected from the group consisting of neodymium-boron-iron, samarium cobalt, ceramic ferrite, and alnico.

5. The system according to claim 2 wherein the magnetized first rod is translatable, relative to the annular ring, coaxially with the axis of the annular ring.

6. The system according to claim 2 wherein: when the magnetized first rod is inserted into the bore: the magnetized first rod fills the bore.

7. The system according to claim 2 wherein the magnetized first rod comprises a cylinder.

8. The system according to claim 7 wherein the magnetized first rod further comprises a tapered first end.

9. The system according to claim 8 further comprising a first nonmagnetic cover over the tapered first end.

10. The system according to claim 7 wherein the magnetized first rod further comprises a tapered second end.

11. The system according to claim 10 further comprising a second nonmagnetic cover over the tapered second end.

12. The system according to claim 2 further comprising a magnetized second rod revolvable relative to the annular ring.

13. The system according to claim 12 wherein at least one of the first and second magnetized rods comprises sintered neodymium-boron-iron.

14. The apparatus according to claim 12 wherein the magnetized rods have equal diameters.

15. The system according to claim 12 wherein the first and second magnetized rods have unequal diameters.

16. The system according to claim 12 wherein the magnetized second rod is diametrically magnetized and, when revolved relative to the annular ring, imparts magnetism to the annular ring whereby the annular ring generates a dipolar magnetic field after the second rod completes a revolution.

17. The system according to claim 16 wherein the magnetized first rod has a first rod magnetic direction and the magnetized second rod has a second rod magnetic direction, and further wherein the first rod magnetic direction and the second rod magnetic direction remain parallel during the revolution.

18. The system according to claim 16 wherein the magnetized second rod is in sliding contact with the annular ring's circumferential periphery during the revolution.

19. The system according to claim 12 wherein the magnetized second rod revolvable relative to the annular ring comprises the magnetized second rod fixed in position while the annular ring revolves around the magnetized second rod.

20. A method for magnetizing, according to Halbach's formula, an initially non-magnetized annular ring to generate a multipole field, comprising:

defining a bore through, and a periphery around, the initially non-magnetized annular ring;

inserting a magnetized first rod into the bore; and removing the magnetized first rod from the bore.

21. The method according to claim 20 wherein the step of inserting the magnetized first rod comprises inserting a diametrically magnetized first rod, and further comprising, when the magnetized first rod is inserted into the bore, imparting magnetism to the annular ring so the annular ring generates a dipolar magnetic field after removing the first rod from the bore.

22. The method according to claim 21 wherein inserting the magnetized first rod and removing the magnetized first rod comprises translating the magnetized first rod, relative to the annular ring, coaxially with an axis of the annular ring.

23. The method according to claim 21 wherein inserting the magnetized first rod comprises filling the bore with the magnetized first rod.

24. The method according to claim 21 further comprising providing the annular ring as a monobloc by mixing magnetic powder with a binder.

25. The method according to claim 24 wherein providing the monobloc annular ring comprises bonding or injection molding.

26. The method of claim 24 wherein mixing the magnetic powder with the binder comprises mixing with the binder at least one substance selected from the group consisting of neodymium-boron-iron, samarium cobalt, ceramic ferrite, and alnico.

27. The method according to claim 21 further comprising revolving a magnetized second rod relative to the annular ring.

28. The method according to claim 27 wherein the step of revolving a magnetized second rod comprises revolving a diametrically magnetized second rod, and further comprising imparting, with the magnetized second rod, magnetism to the annular ring so the annular ring generates a dipolar magnetic field after the magnetized second rod is revolved through a complete revolution.

29. The method according to claim 28 further comprising:

providing the magnetized first rod with a first rod magnetic direction;

providing the magnetized second rod with a second rod magnetized direction; and maintaining parallel the first rod magnetic direction and the second rod magnetized direction while revolving the magnetized second rod relative to an axis of the annular ring.

30. The method according to claim 28 further comprising maintaining a sliding contact between the magnetized second rod and a periphery of the annular ring during the complete revolution.

* * * * *